United States Patent
Han et al.

(10) Patent No.: US 10,557,005 B2
(45) Date of Patent: Feb. 11, 2020

(54) PAINTED POLYOLEFIN ARTICLES

(71) Applicant: Dow Global Technologies LLC, Midland, MI (US)

(72) Inventors: Tao Han, Shanghai (CN); Jeffrey C. Munro, Bellaire, TX (US); Lisa S. Madenjian, Lake Jackson, TX (US); Hong Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/319,577

(22) PCT Filed: Jun. 23, 2014

(86) PCT No.: PCT/CN2014/080543
§ 371 (c)(1),
(2) Date: Dec. 16, 2016

(87) PCT Pub. No.: WO2015/196342
PCT Pub. Date: Dec. 30, 2015

(65) Prior Publication Data
US 2017/0121478 A1    May 4, 2017

(51) Int. Cl.
| | |
|---|---|
| B32B 27/36 | (2006.01) |
| C08J 7/04 | (2020.01) |
| C08L 23/12 | (2006.01) |
| B05D 1/02 | (2006.01) |
| B05D 3/02 | (2006.01) |
| B05D 7/00 | (2006.01) |
| C09D 109/06 | (2006.01) |
| C09D 133/00 | (2006.01) |
| C08L 53/00 | (2006.01) |

(52) U.S. Cl.
CPC ............ *C08J 7/042* (2013.01); *B05D 1/02* (2013.01); *B05D 3/0272* (2013.01); *B05D 7/544* (2013.01); *C08L 23/12* (2013.01); *C08L 53/00* (2013.01); *C09D 109/06* (2013.01); *C09D 133/00* (2013.01); *C08J 2323/12* (2013.01); *C08J 2353/00* (2013.01); *C08J 2409/06* (2013.01); *C08J 2423/12* (2013.01); *C08J 2433/00* (2013.01); *C08J 2453/00* (2013.01)

(58) Field of Classification Search
CPC ...... C09D 153/00; C09D 5/1625; B32B 27/32
See application file for complete search history.

(56) References Cited

U.S. PATENT DOCUMENTS

| | | | |
|---|---|---|---|
| 6,107,404 A | 8/2000 | Ryntz | |
| 6,166,139 A * | 12/2000 | Ryntz | ............... C08L 23/12 525/191 |
| 6,284,833 B1 | 9/2001 | Ford et al. | |
| 6,949,605 B2 | 9/2005 | Shankernarayanan et al. | |
| 7,217,768 B2 | 5/2007 | Salek et al. | |
| 7,671,131 B2 | 3/2010 | Hughes et al. | |
| 7,714,071 B2 | 5/2010 | Hoenig et al. | |
| 7,718,735 B2 | 5/2010 | Kanzaki | |
| 7,825,184 B2 | 11/2010 | Yun et al. | |
| 8,329,824 B2 | 12/2012 | Mori et al. | |
| 2002/0068186 A1 | 6/2002 | Tekelenburg et al. | |
| 2003/0194575 A1 | 10/2003 | Tau et al. | |
| 2007/0112127 A1 | 5/2007 | Soediono et al. | |
| 2012/0245287 A1 | 9/2012 | Demirors et al. | |
| 2012/0308752 A1 * | 12/2012 | He | ............... C08L 23/08 428/36.91 |
| 2013/0017379 A1 | 1/2013 | Hoya et al. | |

FOREIGN PATENT DOCUMENTS

| | | |
|---|---|---|
| WO | 2007/002436 A1 | 1/2007 |
| WO | 2010/128065 A1 | 11/2010 |

OTHER PUBLICATIONS

Songhan Plastic technology "Total PPR 12222 Random copolymer polypropylene", published on Dec. 2007.*
International Search Report and Written Opinion for PCT/CN2014/080543, dated Mar. 24, 2015, pp. 1-7.
International Preliminary Report on Patentability for PCT/CN2014/080543, dated Dec. 27, 2016, pp. 1-5.

* cited by examiner

*Primary Examiner* — Gregory Listvoyb

(57) ABSTRACT

A painted article includes a primer layer between a substrate and a paint layer, of which the substrate is the product of a substrate forming composition including an olefin block copolymer and a polypropylene polymer having a density from 0.89 g/cm$^3$ and 0.92 g/cm$^3$. The substrate is free of (1) phthalate-based plasticizer, (2) halogen-containing polymer, and (3) leachable, small polymeric units derived from styrene monomer.

6 Claims, No Drawings

PAINTED POLYOLEFIN ARTICLES

FIELD

Embodiments relate to a painted article that includes a primer layer between a substrate and a paint layer, and the substrate is formed using a polyolefin based composition.

BACKGROUND

Soft polyvinyl chloride (PVC) is widely used to produce articles like toys, footwear, profiles, instrument panel skins, furniture, sporting goods and the like. Interest exists in replacing the soft PVC in these applications with materials that are considered more environmentally friendly. Especially with respect to toys for small children, interest exists for substitutes for soft PVC that do not contain components, e.g., phthalate-based plasticizers, which leach or otherwise migrate from the article under normal use conditions. Further, interest exists for these substitutes for soft PVC to be paintable with a primer (e.g., to be implemented in a pre-existing manufacturing process that uses primer) and without requiring another surface treatment, while still imparting the desired Shore A hardness to the resultant article.

Polyolefin substrates such as polypropylene substrates have been proposed. However, due to low surface energy and lack of functional groups (polarity) applying a surface coating (painting layer) to polyolefin substrates is challenging task and this drawback has resulted in limited adoption of polyolefin elastomers in paintable toys. Improvement of the paintability of polymeric substrate is often accomplished through the use of surface pretreatment such as plasma, flaming, corona treatment, ion or electron beam treatment, chemical etching, and solvent degreasing. However, such surface pre-treatments provided disadvantages. For example, solvent degreasing may not result in sufficient adhesion. Also, bulk grafting or compounding with polar ingredients such as polyurethane can effectively enhance the adhesion properties of the thermoplastic polyolefin (TPO) surface, grafting technologies create an additional cost. Further, plasma treatment creates a temporary increase in the surface treatment, but is not very effective for three dimensional articles. Accordingly, it would be desirable to produce a TPO compound with excellent adhesion to paint with primers, without the need for surface treatments or the use of polar components.

SUMMARY

A painted article includes a primer layer between a substrate and a paint layer, of which the substrate is the product of a substrate forming composition including an olefin block copolymer and a polypropylene polymer having a density from 0.89 g/cm³ and 0.92 g/cm³. The substrate is free of (1) phthalate-based plasticizer, (2) halogen-containing polymer, and (3) leachable, small polymeric units derived from styrene monomer.

DETAILED DESCRIPTION

Substrates prepared using polyolefin compositions can be used with various painting systems (primer, base coat, paint layer, top coat/clear coat). It has been found that when using a primer based painting system, a substrate prepared using olefin block copolymers (OBC) and polypropylene provide both excellent paint adhesion and abrasion resistance. For example, the finished surface coating (e.g., an outermost surface of the painted article) has excellent paint adhesion (i.e., a score of 0 according to ISO 2409, where 0 is the best and 5 is the worst rating) and resistance to cohesive delamination (i.e., able to pass 10 cycles of an eraser abrasion test).

According to embodiments, the composition for forming a substrate includes an olefin block copolymer (such as copolymer of ethylene and at least one other alpha-olefins such as propylene, butene, octene, etc.) and polypropylene (such as at least one of homopolymer polypropylene—hPP, impact copolymer polypropylene—ICP, and random copolymer polypropylene—RCPP). For example, the olefin block copolymer is a copolymer of ethylene and a $C_{3-20}$ alpha-olefin. The olefin block copolymer may include chemically differentiated units that are joined end-to-end with respect to polymerized the ethylenic functionality and the $C_{3-20}$ alpha-olefin functionality.

For example, the composition for forming the substrate may consist essentially of the compounds that form the olefin block copolymer (e.g., polymer blend that includes the olefin block copolymer and polymers having the same composition as the olefin block copolymer) and polypropylene. The composition for forming the substrate includes from 5 wt % to 95 wt % (e.g., 10 wt % to 90 wt %, 15 wt % to 85 wt %, 20 wt % to 80 wt %, etc.) of the olefin block copolymer and from 5 wt % to 95 wt % (e.g., 10 wt % to 90 wt %, 15 wt % to 85 wt %, 20 wt % to 80 wt %, etc.) of the polypropylene. According to an exemplary embodiment, the composition for forming the substrate includes at least 15 wt % and/or at least 19 wt % of polypropylene and at least 15 wt % and/or at least 19 wt % of the olefin block copolymer. For example, the composition for forming the substrate includes at least 19 wt % of polypropylene and less than 81 wt % of the olefin block copolymer.

The composition for forming the substrate may exclude polyethylene resin (but polyethylene may be present in the olefin block copolymer and/or an olefin block copolymer component that includes the olefin block copolymer). The composition for forming the substrate may optionally include at least one additive. Exemplary additives include a filler (such $CaCO_3$, talc, and silica), a lubricant (such as PDMS and erucamide), a stabilizer, a processing aid, a colorant, a pigment, a dye, an expandable microsphere, a micro glass sphere, a blowing agent, a flame retardant, a compatibilizer, and an additive known to one of ordinary skill in the art for use in forming paintable substrates. Silyated, MAH-grafted polyolefin, ethylene ethyl acrylate, ethylene methyl acrylate, ethylene vinyl acetate (or copolymers thereof) could be added as the compatibilizer. The substrate can be made using injection molding, extrusion, or any other method for making molded parts.

The primer treatment is carried out to modify the surface before painting the polypropylene-based substrate. The primer used with the substrate may be, e.g., a coating of a chlorinated polypropylene (CPP) primer. For example, a CPP primer layer may be directly between the olefin block copolymer/polypropylene based substrate and a paint layer. The primer layer may be applied by conventional methods, such as spraying, brushing, or dipping. The primer layer may be adhered to both the paint layer and the olefin block copolymer or polypropylene in the substrate, thereby creating a unitary three component structure with the paint as the outer portion of the structure and the substrate as the inner portion. The paint layer may be applied by conventional methods such as spraying, brushing or dipping. For example, the paint layer may be formed by styrene-ethylene-butylene-styrene (SEBS)- and/or styrene-butylene-styrene (SBS)-based paint composition and/or an acrylic or acrylic-modified paint (such as those designed for painting a polypropylene-based composition). The substrate may be painted without other surface treatment (i.e., a surface treatment that is different from a primer layer) with paint free of phthalate-based plasticizer.

Definitions

"Composition", "formulation," and like terms means a mixture or blend of two or more components. In embodiments, the mixture or blend of materials including at least an olefin block copolymer and a polypropylene polymer and, optionally, one or more fillers or additives.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Such blends include both mechanical blends made by admixing two or more of the components together in any mechanical manner, e.g., stirring, tumbling, folding, etc., and in-situ or in-reactor blends made by forming and/or mixing the blend components together during the polymerization process in which the polymer components are made.

"Polymer" means a polymeric compound prepared by polymerizing monomers, whether of the same or a different type.

"Homopolymer" means a polymer prepared by the polymerization of one type of monomer.

"Olefin-based polymer", "polyolefin" and like terms mean a polymer containing, in polymerized form, a majority weight percent of an olefin, for example ethylene or propylene, based on the total weight of the polymer. Examples of olefin-based polymers include ethylene-based polymers and propylene-based polymers.

"Plasticizer" and like terms mean an additive that can increase the flexibility and/or lower the glass transition temperature of a polymer, thus increasing the flexibility and softening the feel of an article made from the polymer. Exemplary plasticizers include mineral oils, abietates, adipates, alkyl sulfonates, azelates, benzoates, chlorinated paraffins, citrates, epoxides, glycol ethers and their esters, glutarates, polybutenes, ricinoleates, hydrocarbon oils, isobutyrates, oleates, pentaerythritol derivates, phosphates, phthalates, esters, sebacates, sulfonamides, tri- and pryromellitates, biphenyl derivates, stearates, difuran diesters, and fluorine-containing polymers. Where used, the amount of the plasticizer in the polymer blend can be from greater than 0 to 15 wt %, from 0.5 to 10 wt %, or from 1 to 5 wt % of the total weight of the polymer blend.

"Phthalate-based plasticizer" and like terms mean an additive based on an ester of phthalic acid or similar compound. Exemplary phthalate-based plasticizers include bis(2-ethylhexyl) phthalate, diisononyl phthalate, bis(n-butyl) phthalate, butyl benzyl phthalate and diisodecyl phthalate.

"Free of" and like terms mean that if a composition (such as for the substrate or paint) contains any amount of a particular substance, then the amount of that substance that it does contain is less than the amount allowed by a particular government regulation, customer specification, or the like.

Melt flow rate ($I_2$, grams per 10 minutes or g/10 min) of the propylene based polymers is measured by the procedure of ASTM D1238 (230° C., 2.16 kilograms or kg).

Density (grams per cubic centimeter or $g/cm^3$) of the propylene based polymers is measured by the procedure of ASTM D792.

Propylene Polymer

The propylene comprises least one of homopolymer polypropylene (hPP), impact copolymer polypropylene (ICP), and random copolymer polypropylene (RCPP). The polypropylene has a density from 0.89 $g/cm^3$ to 0.92 $g/cm^3$ (e.g., 0.900 $g/cm^3$ to 0.915 $g/cm^3$, 0.90 $g/cm^3$ to 0.91 $g/cm^3$, 0.895 $g/cm^3$ to 0.910 $g/cm^3$, etc.) The polypropylene polymers may have an MFR of 0.1 g/10 min to 120 g/10 min (e.g., 1 g/10 min to 50 g/10 min, 2 g/10 min to 30 g/10 min, etc.) Exemplary polypropylene includes homopolymer polypropylene, impact copolymer polypropylene and random copolymer polypropylene available from Braskem, LyondellBasell, LG Chem, or Total Petrochemicals.

According to exemplary embodiments, the composition for forming the substrate includes at least 5 wt %, at least 10 wt %, at least 15 wt %, and/or at least 19 wt % of one of hPP, ICP, and RCPP. The remainder may be the olefin block copolymer. The substrate has both excellent paint adhesion and abrasion resistance.

Olefin Block Copolymers

"Olefin block copolymers," "multi-block interpolymer" and "segmented interpolymer" refer to a polymer comprising two or more chemically distinct regions or segments (referred to as "blocks"), e.g., joined in a linear manner, that is, a polymer comprising chemically differentiated units which are joined end-to-end with respect to polymerized ethylenic functionality, rather than in pendent or grafted fashion. The blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity, or any other chemical or physical property.

Compared to block interpolymers of the prior art, including interpolymers produced by sequential monomer addition, fluxional catalysts, or anionic polymerization techniques, the olefin used in the practice of the embodiments are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. The polymers may possess PDI from 1.0 to 3.5. More specifically, when produced in a continuous process, the polymers desirably possess PDI from 1.7 to 3.5, from 1.8 to 3, from 1.8 to 2.5, and/or from 1.8 to 2.2. When produced in a batch or semi-batch process, the polymers desirably possess PDI from 1.0 to 3.5, from 1.3 to 3, from 1.4 to 2.5, and/or from 1.4 to 2.

The term "ethylene multi-block interpolymer" means a multi-block interpolymer comprising ethylene and one or more interpolymerizable comonomers, in which ethylene comprises a plurality of the polymerized monomer units of at least one block or segment in the polymer (e.g., at least 90, at least 95 and/or at least 98, mole percent of the block). Based on total polymer weight, the ethylene multi-block interpolymers have an ethylene content from 25 to 97, from 40 to 96, from 55 to 95, and/or from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an exemplary embodiment, the quantity of extractable polymer using either a dialkyl ether or an alkane-solvent is less than 10, less than 7, less than 5, and/or less than 2, percent of the total polymer weight.

In addition, the multi-block interpolymers used in the practice of the embodiments desirably possess a PDI fitting a Schutz-Flory distribution rather than a Poisson distribution. The use of the polymerization process described in WO 2005/090427 and U.S. Pat. No. 7,608,668 results in a product having both a polydisperse block distribution as well as a polydisperse distribution of block sizes. This results in the formation of polymer products having improved and distinguishable physical properties.

In a further embodiment, the polymers, especially those made in a continuous, solution polymerization reactor, possess a most probable distribution of block lengths. In one embodiment, the ethylene multi-block interpolymers are defined as having at least one of the following:

(a) $M_w/M_n$ from about 1.7 to about 3.5, at least one melting point, $T_m$, in degrees Celsius, and a density, d, in grams/cubic centimeter, where in the numerical values of $T_m$ and d correspond to the relationship $$T_m > -2002.9 + 4538.5(d) - 2422.2(d)^2, \text{ or}$$

wherein d is from 0.850 g/cc, or 0.860, or 0.866 g/cc, or 0.87 g/cc, or 0.880 g/cc to 0.89 g/cc, or 0.91 g/cc, or 0.925 g/cc, and $T_m$ is from 113° C., or 115° C., or 117° C., or 118° C. to 120° C., or 121° C., or 125° C.; and/or (b) $M_w/M_n$ from about 1.7 to about 3.5, and is characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ have the following relationships:

$$\Delta T > -0.1299(\Delta H) + 62.81 \text{ for } \Delta H \text{ greater than zero and up to 130 J/g}$$

$$\Delta T \geq 48C \text{ for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) Elastic recovery, Re, in percent at 300 percent strain and 1 cycle measured with a compression-molded film of the ethylene/∀-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(d) Has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (e) Has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin interpolymer may also have at least one of the following:

(f) Molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; and/or (g) Average block index greater than zero and up to about 1.0 and a molecular weight distribution, $M_w/M_n$ greater than about 1.3.

It is understood that the olefin block copolymer may have one, some, all, or any combination of properties (a)-(g).

Exemplary monomers for use in preparing the ethylene multi-block interpolymers used in the practice of exemplary embodiments include ethylene and one or more addition polymerizable monomers other than ethylene. Exemplary comonomers include straight-chain or branched α-olefins of 3 to 30 (e.g., 3 to 20) carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30 (e.g., 3 to 20) carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

Other ethylene multi-block interpolymers that may be used are elastomeric interpolymers (copolymers) of ethylene, a $C_{3-20}$ alpha-olefin, especially propylene, and, optionally, one or more diene monomers. Exemplary alpha olefins for use in embodiments are designated by the formula $CH_2=CHR^*$, where $R^*$ is a linear or branched alkyl group of from 1 to 12 carbon atoms. Exemplary alpha-olefins include, but are not limited to, propylene, isobutylene, 1-butene, 1-pentene, 1-hexene, 4-methyl-1-pentene, and 1-octene. One particular α-olefin is propylene. The propylene based polymers are generally referred to in the art as EP or EPDM polymers. Exemplary dienes for use in preparing such polymers, especially multi-block EPDM type-polymers include conjugated or non-conjugated, straight or branched chain-, cyclic- or polycyclic dienes containing from 4 to 20 carbon atoms. Exemplary dienes include 1,4-pentadiene, 1,4-hexadiene, 5-ethylidene-2-norbornene, dicyclopentadiene, cyclohexadiene, and 5-butylidene-2-norbornene. One particular embodiment is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers useful in embodiments have a density of less than 0.90, preferably less than 0.89, more preferably less than 0.885, even more preferably less than 0.88 and even more preferably less than 0.875, g/cc. The ethylene multi-block interpolymers may have a density greater than 0.85 and/or greater than 0.86, g/cc. Density is measured by the procedure of ASTM D-792. Low density ethylene multi-block interpolymers are generally characterized as amorphous, flexible and having good optical properties, e.g., high transmission of visible and UV-light and low haze.

The ethylene multi-block interpolymers may have a 2% secant modulus of less than about 150, less than about 140, less than about 120, and/or less than about 100, mPa as measured by the procedure of ASTM D-882-02. The ethylene multi-block interpolymers may have a 2% secant modulus of greater than zero, but the lower the modulus, the better the interpolymer may be adapted for use in embodiments. The secant modulus is the slope of a line from the origin of a stress-strain diagram and intersecting the curve at a point of interest, and it is used to describe the stiffness of a material in the inelastic region of the diagram. Low modulus ethylene multi-block interpolymers may be used because they provide stability under stress, e.g., less prone to crack upon stress or shrinkage.

The ethylene multi-block interpolymers may have a melting point of less than about 125° C. The melting point is measured by the differential scanning calorimetry (DSC) method described in WO 2005/090427 (U.S. Patent Publication No. 2006/0199930). Ethylene multi-block interpolymers with a low melting point often exhibit desirable flexibility and thermoplasticity properties useful in the fabrication of the modules.

The ethylene multi-block interpolymers used, and their preparation and use, are more fully described in U.S. Pat. Nos. 7,579,408, 7,355,089, 7,524,911, 7,514,517, 7,582,716 and 7,504,347.

According to exemplary embodiments, the olefin block copolymer may have a density from 0.85 g/cm³ to 0.89 g/cm³.

Other Composition Components

The composition for forming the substrate may optionally comprise "additional additives." For example, various additives and fillers may be incorporated into the compositions of the embodiments. These materials include, without limitation, plasticizers other than phthalate-based plasticizers (e.g., oil, wax, etc.), stability control agents, nucleating agents, inorganic fillers, conductive fillers, pigments, colorants, antioxidants, acid scavengers, ultraviolet absorbers or stabilizers, flame retardants, processing aids, extrusion aids, anti-static agents, cling additives (for example, polyisobutylene), and anti-block additives. These additives and fillers typically do not include any material that would introduce an element that would leach from the final article under its normal use conditions, e.g., an additive that would contain a phthalate or residual styrene monomer that might leach from a toy intend for a small child who might put it in his or her mouth. Examples of antioxidants are hindered phenols (such as, for example, IRGANOX™ 1010) and phosphites (for example, IRGAFOS™ 168) both trademarks of, and commercially available from, Ciba Geigy Corporation.

Exemplary waxes include Fischer-Tropsch waxes, petroleum-derived waxes, and synthetic waxes. Montan waxes are another type of exemplary wax. Most of these waxes are obtained in the process of refining lube oil in which the waxes are separated from the lube oil stock and refined into various fractions of waxes including paraffins and microcrystalline waxes. In addition to synthetic and/or petroleum-derived waxes, a number of other "natural" waxes may be used, such as carnauba waxes, and commercially available high triglyceride waxes derived from the processing of natural oil-containing commodities such as soybeans, palm and other crops, from which oil can be obtained.

The additives and fillers are advantageously employed in functionally equivalent amounts known to those skilled in the art. For example, the amount of antioxidant employed is that amount which prevents the polymer components from undergoing oxidation at the temperatures and environment employed during storage and ultimate use of the articles made from it. Such amount of antioxidants is usually in the range of from 0.01 to 10, from 0.02 to 5, and/or from 0.03 to 2, wt % based upon the weight of the polymer blend. Similarly, the amounts of any of the other enumerated additives are the functionally equivalent amounts.

Compositions

The compositions may comprise from 5 wt % to 95 wt % of the ethylene-α-olefin copolymer and/or the olefin block copolymer, and from 5 wt % to 95 wt % of the polypropylene.

The compositions are designed to have a Shore A hardness of 50 to 95 and to be paintable by a paint designed to paint SEBS- and SBS-based compositions, or an acrylic-modified paint designed to paint articles made from polypropylene with the use of a primer. These parameters of Shore A hardness and paintability are a function, at least in part, of the α-olefin content of the composition from which the article is made. The α-olefin content in the final composition is calculated from the α-olefin content in the ethylene-α-olefin copolymer (random or block) and the concentration of each component as follows:

$$C_\alpha = \sum_{k=1}^{n} C_\alpha^k W_\alpha^k / 100$$

in which $C_\alpha$ is the mole % concentration of α-olefin in the final composition, $C_\alpha^k$ is the mole % concentration of α-olefin in the k ethylene-α-olefin copolymer and k can vary from 1 to 4 different ethylene-α-olefin copolymers, and $W_\alpha^k$ is the weight % of the k ethylene-α-olefin copolymer in the final composition. $C_\alpha^k$ can be obtained from the vendors.

In one embodiment the content of α-olefin comonomer in the final composition is 10 or more mol % for a 1-octene based ethylene-α-olefin copolymer-based composition that will be painted with a paint designed for painting SEBS-based compositions and/or an acrylic modified paint designed for painting polypropylene articles. In one embodiment the content of α-olefin comonomer in the final composition is 9.7 or more mol % for 1-octene based ethylene-α-olefin copolymers based compositions and paints designed to paint SBS based compositions. Some of the exemplary blends have less than 10 mol % octene in the blend, because there is a high level of PP. For example, a 50/50 blend of INFUSE 9500/PP will only have 6 mol % octene.

The compositions are phthalate-based plasticizer free and styrene-free, and they do not require the use of a phthalate-based plasticizer to achieve the desired level of Shore A hardness. In this regard, the paints that are used to paint the substrates are also free or substantially free of phthalate-based plasticizer (e.g., preferably, but not necessarily, free of at least one of (i) halogen-containing polymer, and (ii) styrene monomer and/or leachable, small polymeric units derived from styrene monomer. In one embodiment, the paint is free or substantially free of at least two, preferably all three, of (i)-(iii). Representative paints include, but are not limited to, paints comprising chlorinated polyolefins, or styrene-ethylene/butylene copolymers, or amide-containing polymers (e.g., acrylamide), or styrene-acrylate type copolymers (e.g., styrene-butylacrylate), or polyurethanes (aliphatic or aromatic based), or combinations of two or more of these materials.

In one embodiment the polyolefin elastomer used in the composition is not functionalized with a polar group, and in one embodiment the polyolefin elastomer does not comprise a phenyl group attached to the backbone. These compositions exhibit good processability and they are particularly well adapted for use in applications that are compromised if a component of the composition, e.g., a phthalate-based plasticizer or residual monomer, leaches or otherwise migrates out of the article made from the composition over the course of the normal use the article.

The embodiments may be used in toys, footwear, furniture, sporting goods, and the like in the same manner as known compositions comprising polyolefin elastomers. In addition to these manufactures, the embodiments may be used in the manufacture of such articles as, but not limited to, gaskets, apparel, hoses and tubing, components for consumer electronics and appliances, and the like. These compositions are used in the same manner as know compositions comprising polyolefin elastomers with and without various fillers and additives, e.g., extrusion, molding, thermoforming, etc.

Unless stated to the contrary, implicit from the context, or customary in the art, all parts and percents are based on weight and all test methods are current as of the filing date of this disclosure. The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, then all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the content of the components in the blends, the Shore A hardness of the article, and the melt flow rate of the polypropylene.

The following experiments are provided to illustrate various embodiments. They are not intended to limit the scope as otherwise described and claimed. All numerical values are approximate, and all parts and percentage are by weight unless otherwise indicated.

EXAMPLES

Materials:

The polyolefin thermoplastics polyolefin raw materials and additives used to make the test substrates are listed in Table 1, below.

TABLE 1

| Product | Producer | Type | Density, g/cc | MFR, dg/min | Hardness Shore | Tg ° C. | Tm, ° C. | Vicat Softening Temp, ° C. |
| --- | --- | --- | --- | --- | --- | --- | --- | --- |
| INFUSE ™ 9500 | Dow | OBC | 0.877 | $5^a$ | 69 (A) | −62 | 122 | — |
| INFUSE ™ 9530 | Dow | OBC | 0.887 | $5^a$ | 83 (A) | −62 | 119 | — |
| INFUSE ™ 9100 | Dow | OBC | 0.877 | $1^a$ | 75 (A) | −62 | 120 | — |
| INFUSE ™ 9010 | Dow | OBC | 0.877 | $0.5^a$ | 71 (A) | −62 | 121 | — |
| HDPE JREX HD592 | JPO | HDPE | 0.963 | $5.3^a$ | — | — | 135 | 130 |
| HDPE HMA 016 | Exxon | HDPE | 0.956 | $20^a$ | — | — | 131 | — |
| MOPLEN ™ EP 332K | Lyondell Basell | rcPP | 0.90 | $5^b$ | — | — | — | — |
| SEETEC M 1600 | LG | icPP | 0.90 | $25^b$ | 100 (R) | — | — | 152 |
| Total PP 9712 | Total | icPP | 0.905 | $25^b$ | 80 (R) | — | 165 | 135 |
| Total PPC 3650 | Total | icPP | 0.905 | $2^b$ | 78 (R) | — | 165 | 135 |
| Total PP 3429 | Total | hPP | 0.905 | $4.3^b$ | 103 (R) | — | 166 | — |
| Total PPR 3221 | Total | rcPP | 0.902 | $1.8^b$ | 82 (R) | — | — | 130 |
| MB50-001 | Multibase | 50% siloxane in LDPE | — | — | — | — | — | — |

TABLE 1-continued

| Product | Producer | Type | Density, g/cc | MFR, dg/min | Hardness Shore | Tg ° C. | Tm, ° C. | Vicat Softening Temp, ° C. |
|---|---|---|---|---|---|---|---|---|
| MB50-002 | Multibase | 50% siloxane in PP | — | — | — | — | — | — |

[a]Measured at 190° C., 2.16 kg
[b]Measured at 230° C., 2.16 kg

The glass transition temperature and melting temperatures are determined by DSC. Hardness is listed as Shore A (A), Shore D (D), or Rockwell (R). The two MB50 products are masterbatches containing 50% ultra-high molecular weight poly dimethylsiloxane dispersed in a thermoplastic resin. These masterbatches are used as additives to improve processing performance and modify surface characteristics, including reduced coefficient of friction and better mar and abrasion resistance.

The following paint packages are used (each package consists of multiple components and/or layers):
(1) PVC paint package (available from Hang Cheung Petrochemical, Ltd.)
  (i) Polypropylene Primer: Chlorinated polypropylene in xylene solution.
  (ii) PVC Paint Thinner—T510: Mixture of cyclohexanone, xylene, and butyl acetate.
  (iii) PVC Paint—5300 Series: Base resin is a blend of acrylic acid polymers, vinyl chloride-vinyl acetate copolymer, and alkyd resin.
(2) SBS paint package (available from Hang Cheung Petrochemical, Ltd.)
  (i) SBS Paint Thinner—T593: Mixture of cyclohexanone and methyl ethyl ketone.
  (ii) 5900 Series SBS Paint: SBS (styrene-butadiene-styrene) polymer based paint.
  (iii) 6100 Series PU Paint: Polyurethane based paint.
(3) Peter-Lacke paint package
  (i) PEHAFIX Thinner No. 4 (Article number: VPCH02008): Mixture of acetone, 2-butoxyethanol, and heptane.
  (ii) PEHAFIX colorless Primer (Article number: VPCH07250): CPO type primer.
  (iii) PEHACRYL-PM 2C Metallic Varnish (Article number: VPCH07875): Reactive acrylic-type paint, possibly including carbon black as pigment.
  (iv) PEHAPOL-L Hardener (Article number: P85057): Hexamethylene-1,6-diisocyanate homopolymer.

Sample Preparation
(1) Twin Screw Extrusion and Pelletizing

Compounding is performed on a Coperion ZSK 18 co-rotating intermeshing twin screw extruder, D=18 mm, L/D=48. The extruder has 8 temperature control zone and is equipped with a two-hole 2 mm die, 2 m long cooling water bath and air knife. Compounding is performed with the temperature profile set at 100/150/180/180/200/200/200/180° C. The feeding rate is 10 kg/hr, screw RPM is 800, and torque is approximately 40%.

(2) Dry Blending

Samples are dry blended from pellets and fed directly into an injection molding machine feed hopper.

(3) Injection Molding

Plaque samples are molded using a Fanuc Roboshot S-2000 I 100BH, 100 ton injection molding machine equipped with a plaque mold (dimension: 5 cm×5 cm×2 mm). The barrel temperature profile is set at 50/170/200/200/200/200° C. The mold temperature is 30° C. and the injection speed is 30 mm/s. Molded plaques are held at 40 MPa for 20 seconds and then cooled for an additional 16 seconds.

(4) Spray Painting 4.1. Air Spray Gun: A gravity feed air spray gun (ANEST IWATA, model: W-101-134G) is used to paint sample plaques. The spray gun has a 1.3 mm diameter nozzle, fluid output of 140 mL/min, spray pattern width of 205 mm, and uses an atomizing pressure of 28.0 psi.

4.2. Coating Booth and PPE: Spray painting is done inside a coating booth located in SDC IF heavy-lab with proper personal protection equipment, including: 3M 7502 respirator with 6001 cartridge, 3M lab safety PC glasses, and Ansell blue nitrile gloves.

4.3. Baking Oven: Samples painted with Peter-Lacke 2k acrylic paint are baked (5 min for primer and 20 min for topcoat) at 80° C. in Thermo Scientific Lindberg or Blue M vacuum ovens. The vacuum ovens are connected to an in-house vacuum source.

(5) Plasma Treatment

Plasma treatment is done by an external lab for which detailed equipment information and process parameters were not available. The increase in surface energy of treated samples is confirmed with dyne pens. Surface energy increased from below 30 dyne/cm to above 40 dyne/cm.

(6) Characterization Methods 6.1. Abrasion Resistance Test (Eraser Test): The eraser test is designed to determine the abrasion resistance of the surface coating. The test was done with the following procedure:

Hold the eraser (Blaisdell #536-T Eraser/Sanford Magi Rub 1960 Peel off Eraser) perpendicular to the surface coating test area and apply a downward force of 7 N (1.5 lbf). Stroke or erase along a suitable test path length (~3 cm) in one direction. Examine the damage of the coating (or record how many strokes, up to 10 strokes, are required to damage the surface).

6.2. Adhesion Strength Test (Cross-Hatch Test): Cross-hatch testing is a well-established test method to determine the adhesion strength of a coating to a substrate. The following test procedure was used:

Use the cross-hatch scribe to make 11 straight parallel cuts, 1 mm apart, through the surface coating. Then make 11 similar cuts perpendicular to the first set of cuts. Apply tape (3M #810) to the scribed area and rub with fingers to provide adequate contact pressure. Grasp the loose end of the tape and pull smoothly and quickly at an angle of 135 degrees to the surface to remove the tape from the surface. Examine the surface for any evidence of paint removal. According to ISO 2409 or ASTM D3359 Method B, the paint adhesion can be graded using the scales. For the samples discussed below, the ISO 2409 ranking system is used.

Working Examples and Comparative Examples

Various samples according to Examples are prepared according to the approximate formulations discussed below.

Comparative Example A

The paintability of INFUSE™ 9500 and/or high density polyethylene (HDPE) using seven different sample combinations is considered. In particular as shown in Table 2, INFUSE™ 9500/HDPE compounds are painted using two methods: (1) PVC paint without pretreatment, and (2) Peter-Lacke (P-L) 2K acrylic paint with primer. The amounts in the formulations in Table 2, below, are measured as weight percent based on the total weight of the formulation.

TABLE 2

| Ingredients (wt %) | 1 | 2 | 3 | 4 | 5 | 6 | 7 |
| --- | --- | --- | --- | --- | --- | --- | --- |
| INFUSE 9500 | 100 | 80 | 60 | 50 | 40 | 20 | |
| HDPE JREX HD592 | | 20 | 40 | 50 | 60 | 80 | 100 |
| Total | 100 | 100 | 100 | 100 | 100 | 100 | 100 |
| PVC-paint no pretreatment | | | | | | | |
| Adhesion | 5 | | 5 | 5 | 5 | 5 | 5 |
| Abrasion | 1 | | 1 | 1 | 1 | 1 | 1 |
| Peter-Lacke with Primer | | | | | | | |
| Adhesion | 1 | | 5 | 5 | 5 | 5 | 5 |
| Abrasion | 4 | | 2 | 2 | 1 | 1 | 1 |

Adhesion: 0 (best) to 5 (worst)
Abrasion: number of strokes to damage paint

As illustrated in Table 2, without pretreatment, PVC paint showed almost no adhesion to INFUSE™ 9500/HDPE substrates. The same phenomenon is observed for P-L painted samples even when primed with CPP. Since there are not any strong interlayer/intermolecular interactions between the INFUSE™ 9500/HDPE substrate and PVC paint other than mechanical locking, the adhesion of the paint to the substrate is poor. Use of a CPP primer does not result in good adhesion between INFUSE™ 9500/HDPE substrates and Peter-Lacke 2K acrylic paint, although adhesion to pure INFUSE™ 9500 is better than adhesion to the blends.

Example 1

The paintability of INFUSE™ 9500 and/or PP ICP using seven different sample combinations is considered. In particular as shown in Table 3, INFUSE™ 9500/PP compounds are painted using two methods: (1) PVC paint without primer, and (2) Peter-Lacke 2k acrylic paint with primer. The amounts in the formulations in Table 3, below, are measured as weight percent based on the total weight of the formulation.

TABLE 3

| Ingredients (wt %) | 8(1) | 9 | 10 | 11 | 12 | 13 | 14 |
| --- | --- | --- | --- | --- | --- | --- | --- |
| INFUSE 9500 | 100 | 80 | 60 | 50 | 40 | 20 | |
| PP ICP M 1600 | | 20 | 40 | 50 | 60 | 80 | 100 |
| Total | 100 | 100 | 100 | 100 | 100 | 100 | 100 |
| PVC-paint with no preatreatment | | | | | | | |
| Adhesion | 5 | 5 | 5 | 5 | 5 | 5 | 5 |
| Abrasion | 1 | 1 | 1 | 1 | 1 | 1 | 1 |
| Peter-Lacke with Primer | | | | | | | |
| Adhesion | 1 | 0 | 0 | 0 | 0 | 0 | 5 |
| Abrasion | 4 | >10 | >10 | >10 | >10 | >10 | >10 |

Adhesion: 0 (best) to 5 (worst)
Abrasion: number of strokes to damage paint

As shown in Table 3, above, without pretreatment the PVC-paint did not bond to the INFUSE™ 9500/PP substrates. However, the adhesion results when using the CPP primer and Peter-Lacke 2K acrylic paint is different. The adhesion and abrasion results were very good for this paint system using blends of INFUSE™ 9500/PP. The improved compatibility of CPP with PP results in better entanglement of the primer with the substrate.

Example 2

The patentability of various INFUSE™ OBC grades and various PP grades on paintability are evaluated using seven different sample combinations. In particular, as shown in Table 4, various INFUSE™ grades/various PP compounds are painted using the Peter-Lacke 2k acrylic paint with primer method (in particular, INFUSE™ 9500, INFUSE™ 9530, INFUSE™ 9100, and INFUSE™ 9010). The amounts in the formulations in Table 4, below, are measured as weight percent based on the total weight of the respective formulations.

TABLE 4

| | | | | | | | |
| --- | --- | --- | --- | --- | --- | --- | --- |
| INFUSE 9500 | 70 | | | | | | |
| INFUSE 9530 | | 70 | | | 70 | 70 | 70 |
| INFUSE 9100 | | | 70 | | | | |
| INFUSE 9010 | | | | 70 | | | |
| PP ICP 3650 | | | | | | 30 | |
| PP ICP 9712 | | | | | | | 30 |
| PP HPP 3429 | 30 | 30 | 30 | 30 | 30 | | |
| MB50-001 | | | 2 | 2 | 2 | 2 | 2 |
| Total | 100 | 100 | 102 | 102 | 102 | 102 | 102 |
| Peter-Lacke With Primer | | | | | | | |
| Adhesion | 2 | 0 | 0 | 0 | 0 | 0 | 0 |
| Adhesion | 8 | >10 | 8 | >10 | >10 | >10 | >10 |

Adhesion: 0 (best) to 5 (worst)
Abrasion: number of strokes to damage paint

Comparing three different grades of PP in Table 4, above, various PP's type on the paint adhesion or abrasion resistance. Blends prepared with PP ICP grades have good paintability with the primer. Some differences in the paintability of blends with different INFUSE™ grades were observed (samples 40-43). The paintability may be observed to have the following rank: INFUSE™ 9530=INFUSE™ 9010>INFUSE 9100>INFUSE 9500.

Example 3

The effects of primers and polyurethane clear coats on paintability of polyolefin blends are considered. In particular, as shown in Table 5, INFUSE™ 9530/PP compounds are painted using three methods: (1) Peter-Lacke 2k acrylic paint with primer, (2) Hangcheung SBC with solvent pretreatment, and (2) Hangcheung SBC—primer with PU coat. The amounts in the formulations in Table 5, below, are measured as parts by weight.

TABLE 5

| | | | |
|---|---|---|---|
| INFUSE 9530 | 70 | 70 | 70 |
| PP ICP 9712 | 30 | | |
| PP HPP 3429 | | 30 | 30 |
| MB50-001 | 2 | 2 | |
| Total | 102 | 102 | 100 |
| Peter-Lacke With Primer | | | |
| Adhesion | 0 | 0 | 0 |
| Abrasion | >10 | >10 | >10 |
| Hangcheung SBC-solvent | | | |
| Adhesion | 0 | 0 | 0 |
| Abrasion | 5 | 5 | 5 |
| Hangcheung SBC- primer-PU coat | | | |
| Adhesion | 0 | 0 | 0 |
| Abrasion | >10 | >10 | >10 |

Adhesion: 0 (best) to 5 (worst)
Abrasion: number of strokes to damage paint

Referring to Table 5, above, when the solvent pre-treatment is used, the SBC paint has good adhesion to the INFUSE™ 9530/PP substrate, but the abrasion resistance of the paint is poor. In addition, a CPP primer used instead of the solvent pretreatment (primer/SBC paint/PU top coat) has good adhesion to INFUSE™ OBC/PP substrates and good abrasion resistance.

Comparative Example B

The effects of three different pre-treatments on paintability are considered.

TABLE 6

| | | | |
|---|---|---|---|
| INFUSE 9010 | | | 33.6 |
| INFUSE 9500 | | | 15.8 |
| VERSIFY 3401 | 46.90 | 46.90 | |
| HDPE HMA-016 | | | 42.50 |
| PP HPP 3429 | 45.00 | | |
| RCP PPR 3221 | | 45.00 | |
| CaCO3 | 5.00 | 5.00 | 5.00 |
| MB50-001 | 3.00 | 3.00 | |
| MB50-002 | | | 3.00 |
| AO | 0.10 | 0.10 | 0.10 |
| Total | 100.0 | 100.0 | 100.0 |
| Hangcheung SBC without pretreatment | | | |
| Adhesion | 5 | 5 | 5 |
| Abrasion | 1 | 1 | 1 |
| Hangcheung SBC-plasma | | | |
| Adhesion | 5 | 5 | 5 |
| Abrasion | 1 | 1 | 1 |
| Hangcheung SBC-solvent | | | |
| Adhesion | 5 | 5 | 3 |
| Abrasion | 5 | 5 | 5 |

Adhesion: 0 (best) to 5 (worst)
Abrasion: number of strokes to damage paint

As shown above, the adhesion is relatively poor and in some samples abrasion is also relatively poor.

Although embodiments have been described with certain detail through the preceding specific embodiments, this detail is for the primary purpose of illustration. Many variations and modifications can be made by one skilled in the art without departing from the spirit and scope as described in the following claims.

What is claimed is:

1. A painted article, comprising:
   a primer layer between a substrate and a paint layer, the substrate being the product of a substrate forming composition including at least 50 wt % of an olefin block copolymer, based on the total weight of the substrate forming composition, and a polypropylene polymer having a density from 0.89 g/cm$^3$ and 0.92 g/cm$^3$,
   wherein the substrate is free of (1) phthalate-based plasticizer, (2) halogen-containing polymer, and (3) leachable, small polymeric units derived from styrene monomer, and
   wherein the substrate forming composition comprises an alpha-olefin comonomer content of less than 9.7 mol %.

2. The painted article as claimed in claim 1, wherein an outermost surface of the painted article has an adhesion score of 0 according to ISO 2409 and resistance to cohesive delamination as demonstrated by the ability to pass 10 cycles of an eraser abrasion test.

3. The painted article as claimed in claim 2, wherein:
   the olefin block copolymer is a copolymer of ethylene and a $C_{3-20}$ alpha-olefin.

4. The painted article as claimed in claim 2, wherein:
   the olefin block copolymer includes chemically differentiated units that are joined end-to-end with respect to polymerized ethylenic functionality and a $C_{3-20}$ alpha-olefin functionality.

5. The painted article as claimed in claim 1, wherein the substrate is painted without other surface treatment with paint free of phthalate-based plasticizer, and the paint layer includes one of SEBS and/or SBS based paint and acrylic or acrylic-modified paint.

6. The painted article as claimed in claim 1, wherein the painted article is at least one of a toy, footwear, furniture, sporting good, gasket, apparel, hose or tubing, and a component for a consumer electronic device or an appliance.

* * * * *